United States Patent [19]

Kawashita et al.

[11] Patent Number: 4,631,671
[45] Date of Patent: Dec. 23, 1986

[54] DATA PROCESSING SYSTEM CAPABLE OF TRANSFERRING SINGLE-BYTE AND DOUBLE-BYTE DATA UNDER DMA CONTROL

[75] Inventors: Asayoshi Kawashita, Chigasaki; Hirofumi Kuniga, Hadano, both of Japan

[73] Assignee: Hitachi, Ltd., Tokyo, Japan

[21] Appl. No.: 443,873

[22] Filed: Nov. 23, 1982

[30] Foreign Application Priority Data

Nov. 26, 1981 [JP] Japan ............... 56-190258

[51] Int. Cl.[4] ............... G06F 3/04
[52] U.S. Cl. ............... 364/200
[58] Field of Search ... 364/200 MS File, 900 MS File

[56] References Cited

U.S. PATENT DOCUMENTS

| | | | |
|---|---|---|---|
| 4,263,650 | 4/1981 | Bennett et al. | 364/200 |
| 4,292,668 | 9/1981 | Miller et al. | 364/200 |
| 4,300,193 | 11/1981 | Bradley et al. | 364/200 |
| 4,378,591 | 3/1983 | Lemay | 364/200 |
| 4,514,808 | 4/1985 | Murayama et al. | 364/200 |
| 4,530,053 | 7/1985 | Kirz et al. | 364/200 |

OTHER PUBLICATIONS

Intel Component Data Catalog 1980, Intel Corp. 3065 Bowers Ave., Santa Clara, CA, 95051.
Zilog Data Book 1982, Zilog Inc., 1315 Dell Drive, Campbell, CA., 95008.

*Primary Examiner*—Gareth D. Shaw
*Assistant Examiner*—Daniel K. Dorsey
*Attorney, Agent, or Firm*—Antonelli, Terry & Wands

[57] ABSTRACT

A data processing system having a data bus with a two-byte capacity provides for the DMA transfer of both one-byte data and two-byte data between a memory and an input/output adapter. An address counter and a byte counter receive a start address and a byte number indicating the number of bytes to be transferred, respectively, through the system bus from the processor. The least significant bits in the start address and the byte number are used to control whether the data transfer on the bus will be a one-byte transfer or a two-byte transfer for the first transfer operation and the last transfer operation.

5 Claims, 8 Drawing Figures

FIG. 3a
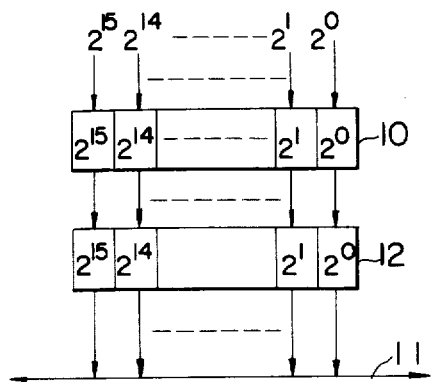
FIG. 3b
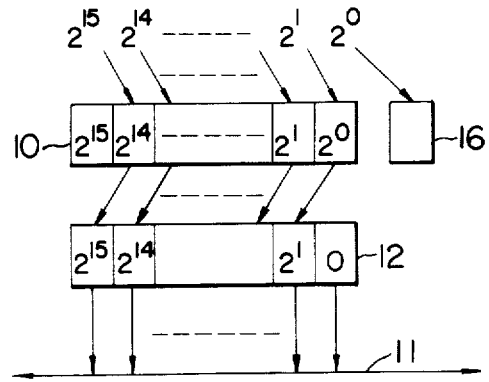
FIG. 4a
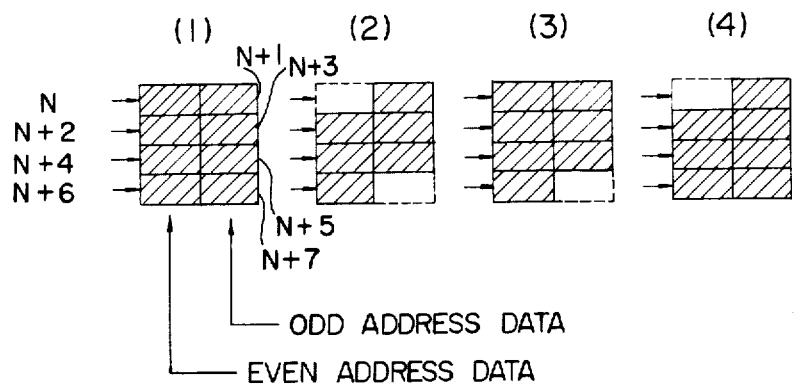
FIG. 4b
|  | (1) | (2) | (3) | (4) |
|---|---|---|---|---|
| TRANSFER BYTE NUMBER | 1000 | 0110 | 0111 | 0111 |
| VALUE OF SHIFT TO RIGHT | 0100 | 0011 | 0011 | 0011 |
| DMA CYCLE | 4 | 4 | 4 | 4 |

| CASE | LSB OF ADDRESS COUNT =F/F 16 | LSB OF BYTE COUNT =F/F 17 | EVEN ADDRESS DATA INHIBITING SIGNAL | ODD ADDRESS DATA INHIBITING SIGNAL | COUNT DOWN OF BYTE COUNTER DURING FIRST DMA CYCLE |
|---|---|---|---|---|---|
| (1) | 0 | 0 | 0 | 0 | PRESENT |
| (2) | 1 | 0 | 1 | 1 | ABSENT |
| (3) | 0 | 1 | 0 | 1 | ABSENT |
| (4) | 1 | 1 | 1 | 0 | ABSENT | ata processing system and more particularly to a DMA (Direct Memory Access) processing system which is capable of improving through-put of the bus over the entire system and expanding utilization of the data bus.

DATA PROCESSING SYSTEM CAPABLE OF TRANSFERRING SINGLE-BYTE AND DOUBLE-BYTE DATA UNDER DMA CONTROL

BACKGROUND OF THE INVENTION

This invention relates to a data processing system and more particularly to a DMA (Direct Memory Access) processing system which is capable of improving through-put of the bus over the entire system and expanding utilization of the data bus.

Where it is desired in a computer system to reduce the number of connections to an input/output unit which requires high speed data transfer and the degree of intervention of programs in the input/output operation of data, DMA controlling is effected for direct transfer of data between the input/output unit and a memory.

For example, in a computer system 5 as shown in FIG. 1, a processor 1, a memory 2 and an adaptor 3 are connected to each other through a system bus 4 consisting of an address bus, a data bus and a control bus and in some applications, input/output data exchanged between a data input/output unit 6 and the adaptor 3 is transferred between the memory 2 and the adaptor 3 in a DMA controlling mode. More particularly, the adaptor 3 which is permitted to occupy the system bus 4 starts its internal DMA control circuit so that address codes representative of addresses in the memory 2 to be subjected to DMA control may be sent to the address lines of the system bus 4. When writing data in a DMA mode, the data is sent on the data lines of the bus simulataneously with the delivery of the address.

An 8-bit series in which addressing of memories is effected in one byte unit has been predominant in conventional microcomputers, but in recent years, microcomputers of a 16-bit series have been gaining widespread use. Under the circumstances, in some applications, an 8-bit series microcomputer is connected with a 16-bit series microcomputer and even in a system utilizing a 16-bit data bus, addressing of memories is effected in units of one byte. This means that 8 out of 16 bits for the data bus lie idle.

More particularly, in order to send address codes representative of addresses in the memory 2 to be subjected to DMA control to the address bus, the lower byte in the first word is transferred during the first DMA operation and upper byte in the first word is transferred during the second DMA operation. Similarly, for each of the second and following words a bit is sent in each of two DMA operations. In other words, the DMA cycle must always be repeated twice for transfer of 16-bit data, thus degrading the through-put and effectiveness of the DMA control of the bus.

SUMMARY OF THE INVENTION

This invention contemplates elimination of the conventional drawbacks and has for its object to provide a data processing system capable of taking advantage of the 16-bit data bus for DMA data transfer to improve the through-put of the bus.

According to one aspect of the invention, in a data processing system comprising a processor, a memory and an input/output adaptor which are connected to a system bus so that input/output adaptor has a function of transferring DMA data at one byte per cycle between the memory and the input/output adaptor, an address for the memory and a byte number indicating the number of bytes of data to be transferred from the processor are respectively set into an address counter and a byte counter of the input/output adaptor through the system bus so that digits of the address and byte number are put into digits of the address counter and byte counter which are lowered or shifted to lower side by one bit from digits of the counters corresponding to digits of the address and byte number, whereby DMA data transfer at two bytes per cycle can be effected.

BRIEF DESCRIPTION OF THE DRAWINGS

FIGS. 3a and 3b show the manner of setting an address counter according to the prior art and the invention, respectively;

FIGS. 4a and 4b are representations useful in explaining execution of initial and final DMA cycles in particular examples in accordance with the invention;

DESCRIPTION OF PREFERRED EMBODIMENT

Figure 1:
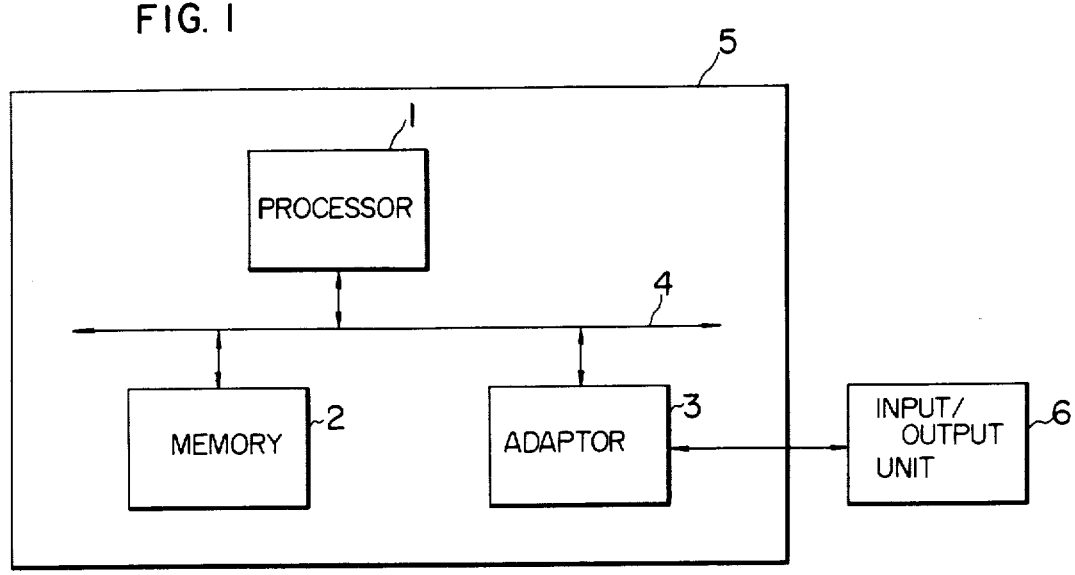
FIG. 1 is a block diagram showing an overall construction of a computer system.
Figure 2:
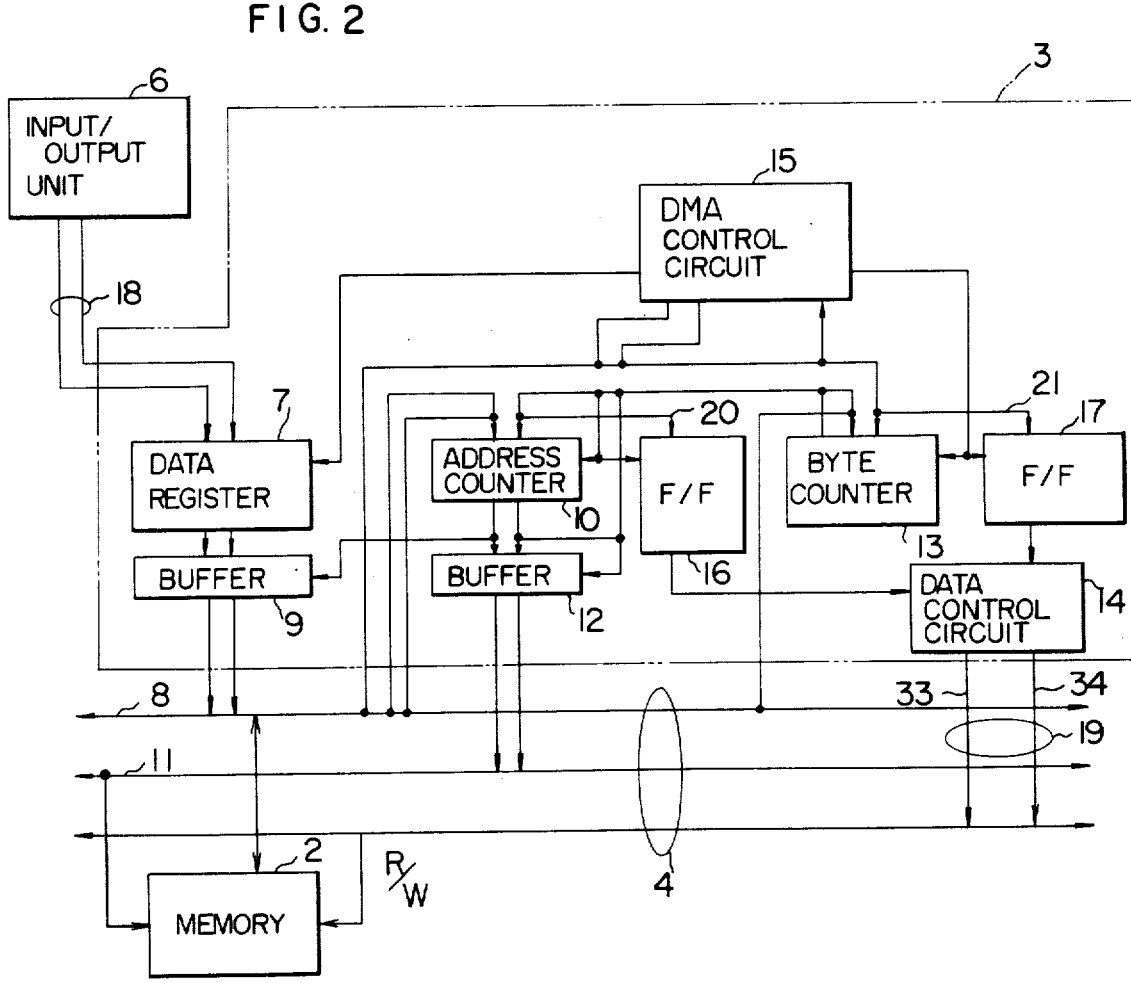
FIG. 2 is a block diagram showing a construction of an adaptor embodying the invention.

The invention will now be described by way of example with reference to the drawings. FIG. 2 shows, in block form, the construction of an input/output adaptor and its connection to a memory and an input/output unit.

The memory 2 in FIG. 2, constructed as shown at (1) in FIG. 4a, has an addressing system in which the upper 8 bits constitute even adresses and lower 8 bits constitute odd addresses and its read/write operation can be effected with 16 bits or 8 bits. In the case of read/write operation with 16 bits, reading/writing of even and odd addresses (for example, N and N+1) can be effected simply by designating the even address N.

The adaptor shown in FIG. 2 comprises a data register 7 into which is set data 18, which is received from the data input/output unit 6, a data buffer 9 for sending the data to a data bus 8, an address counter 10 which is programmable to be set with an address by the processor through the bus 8, an address buffer 12 for sending the address to an address bus 11, a byte counter 13 for managing the number of bytes for DMA transfer, a data control circuit 14 adapted to control 1 byte/2 byte switching of transfer data, and a DMA control circuit 15 for the overall controlling in the adaptor.

Prior to starting DMA transfer, a transfer start address and a transfer byte number are set by the processor into the address counter 10 and the byte counter 13 through the data bus 8. The address counter 10 is connected to a flip-flop 16 into which the least significant bit of an address transferred from the data bus 8 is set. Similarly, the byte counter 13 is also connected to a flip-flop 17 into which the least significant bit of a byte number of the data to be transferred from the data bus 8 is set.

FIG. 3a shows the manner of setting an address counter in prior art and FIG. 3b shows how this is done according to this invention. FIGS. 3a and 3b serve to describe the manner of setting the address counter in FIG. 2, in comparison to the prior art. The transfer start address is set by the processor into the address counter 10 such that in the prior art its digits are supplied in one-to-one correspondence to corresponding stages of the counter 10 as shown in FIG. 3a but in the present invention, its digits are supplied to one bit position lower in the stages of the counter 10, as shown in FIG. 3b. The digit of $2^0$ is set into the flip-flop 16. When the address set into the address counter 10 is sent to the address bus 11, the least significant bit of the address buffer 12 is fixed to zero to ensure that the least significant bit $2^0$ of the address becomes zero. Accordingly, the address sent to the address bus 11 through the address buffer 12 whose least significant bit is fixed to zero always becomes an even number. Specifically, addresses N, N+2, N+4 and N+6 as illustrated at (1) in FIG. 4a are designated. In this case, 16-bit (2-byte) data is transferred during the first DMA transfer operation and thereafter, the value of the address counter 10 is incremented (the counter 10 is caused to count up by one) so that the preceding value is advanced by 2 to provide an address for the subsequent DMA transfer operation. This operation is repeated to carry out accessing to the memory 2 in units of 2 bytes for the number of bytes of data to be transferred.

Similarly, the bits indicating the number of bytes are shifted by one bit and set into the byte counter 13 so that when the byte counter 13 is decremented (the counter 13 is caused to count down by one) after completion of the first DMA transfer, the byte number is reduced by 2 bytes.

On the other hand, when the DMA transfer start address is odd or the transfer end address is even, the correct DMA transfer cannot be carried out only by shifting by one bit the values to be set into the address counter, and the byte counter as in the previous manner. If DMA transfer of 2-byte data is carried out in the previous manner, even address data will be destroyed when the transfer start address is odd or odd address data will be destroyed when the transfer end address is even. In these cases, therefore, there is a need to provide a countermeasure for preventing such data destruction as will be described below.

FIG. 4a shows developed views on the memory useful in explaining four cases in which even and odd address data to be processed at the beginning of transfer and at the end of transfer are combined differently in accordance with combinations of the transfer address and the data in the DMA transfer to be carried out according to the invention. FIG. 4b shows the number of transfer bytes, values of the byte number which are shifted to the right by one digit (these values being set into the byte counter), and the number of DMA cycles on the assumption that a two-byte transfer operation (one byte transfer is partly involved) is carried out. The DMA transfer operations (1) to (4) in FIG. 4a correspond to sections (1) to (4) in FIG. 4b.

In the DMA transfer operation (1) in FIG. 4a, hatched portions represent memory areas at which the DMA transfer is carried out. Thus, the DMA transfer starts from an even address N, data on addresses N and N+1 are transferred during the first DMA cycle, data on addresses N+2 and N+3 and addresses N+4 and N+5 are then transferred sequentially, and finally data on addresses N+6 and N+7 are transferred and the DMA transfer ends. Control of this series of operations is determined by values at section (1) in FIG. 4b, namely, a byte number of "1000" or 8 bytes, a value set into the byte counter of "0100" or 4 resulting from shifting the byte number by one digit to the right, and number of DMA cycles of 4 which is comparable to the setting value of 4.

In the DMA transfer operation (2) in FIG. 4a and corresponding section (2) in FIG. 4b, the DMA transfer starts from an odd address N+1 and finally terminates in an even address N+6. In this case, the transfer byte number is "0100" or 6 bytes, and the value set into the byte counter resulting from shifting the byte number by one digit to the right is "0011" or 3. The required number of DMA cycles is, however, set to 4 under the control of the data control circuit 14 to be described later, so that the DMA transfer may be carried out while protecting memory data on void memory areas depicted at the example (2) in FIG. 4a, i.e., on addresses N and N+7. Thus, both the even address data during the initial DMA transfer and the odd address data during the final DMA transfer can be protected.

In the DMA transfer operation (3) in FIG. 4a and corresponding section (3) in FIG. 4b, the DMA transfer starts from an even address N and terminates in an even address N+6. In this case, the transfer byte number is "0111"0 or 7, and the value set into the byte counter resulting from shifting the byte number by one digit to the right is "0011" or 3. The required number of DMA cycles is, however, set to 4 as in the previous case, so that the DMA transfer may be carried out while protecting memory data on a void memory area depicted at the example (3) in FIG. 4a, i.e., on address N+7. Thus, 2-byte data is transferred during three DMA cycles, but during the final DMA cycle, a one byte data transfer to the address N+6 is carried out while protecting data on the void address N+7.

In the DMA transfer operation (4) in FIG. 4a and corresponding section (4) in FIG. 4b, the DMA transfer starts from an odd address N+1 and terminates in an odd address N+7. In this case, the transfer byte number is "0111"0 or 7, and the value set into the byte counter resulting from shifting the byte number by one digit to the right is "0011" or 3. The required number of DMA cycles is, however, set to 4 as in the previous case, so that the DMA transfer may be carried out while protecting memory data on a void memory area depicted at the example (4) in FIG. 4a, i.e., an address N. Thus, during the first DMA cycle, one byte data transfer to the address N+1 is carried out while protecting data on the address N and during the following three DMA cycles, the data transfer starting from an address N+2 is carried out at a rate of 2 bytes for each cycle.

Figures 5, 6:
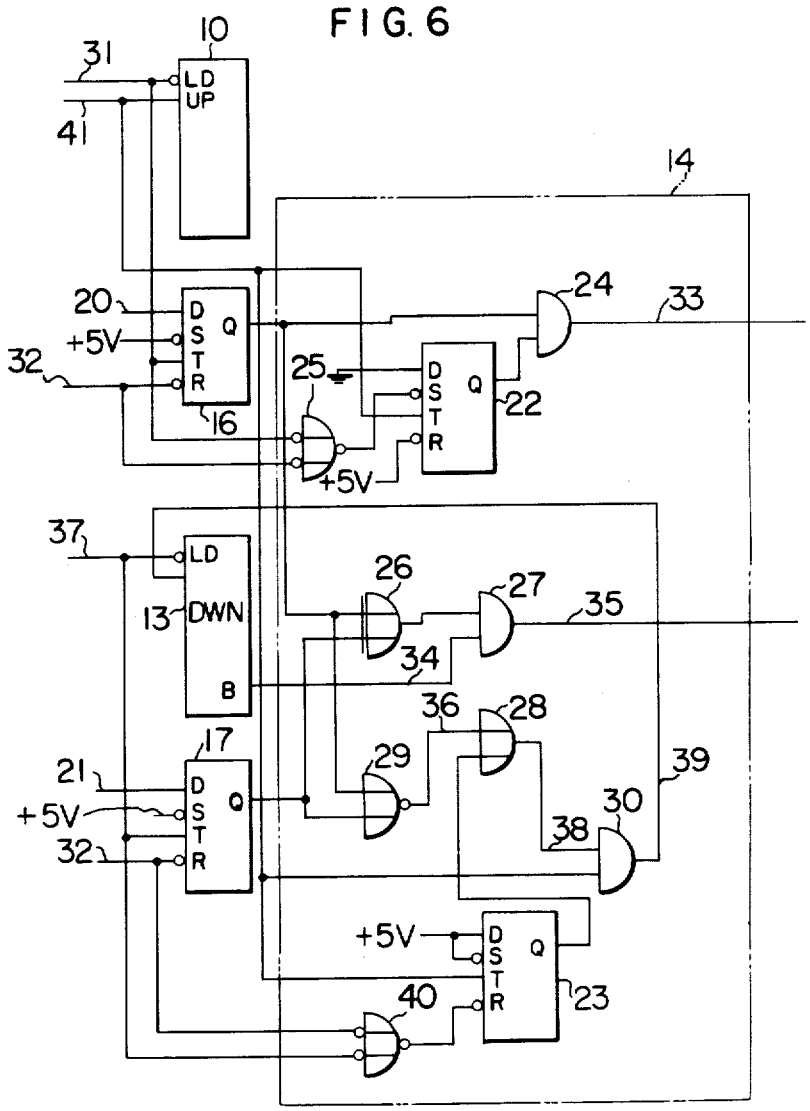
FIG. 5 is a tabular representation showing conditions required for a data control circuit in the examples shown in FIGS. 4a and 4b.
FIG. 6 is a logical circuit diagram of a data control circuit in FIG. 2.

Cases (1) to (4) in FIG. 5 corresponding to examples (1) to (4) in FIGS. 4a and 4b explain different operations of the data control circuit 14 shown in FIG. 2 related to the respective sections in FIGS. 4a and 4b by referring to logical values of an even address data inhibiting signal 33 and an odd address data inhibiting signal 35 which are delivered out of the data control circuit 14 during the initial and final DMA cycles. Thus, each case in FIGS. 5, 4a and 4b will be described in relation to the operation of each component in FIG. 2.

In the case (1) in FIG. 5 (example (1) in FIGS. 4a and 4b), the DMA start address is N representative of an even value and hence the least significant bit of the address is "0". Accordingly, the flip-flop 16 remains reset. The address counter 10 is then set with a value of N/2. Since the transfer byte number is an even value of 8, the flip-flop 17 also remains reset. The byte counter 13 is then set with a value 4 (=8/2). Consequently, during the first DMA transfer, both the even address inhibiting signal 33 and the odd address inhibiting signal 35 delivered out of the control circuit 14 assume logical value "0" and 2-byte DMA transfer is carried out. Concurrently therewith, the address counter 10 is incremented by one, reaching N/2+1, and the next DMA address has a value of N+2 which is twice N/2+1. The byte counter 13, on the other hand, is decremented by one to reach 3 (=8/2−1). Thereafter, the DMA transfer and control is carried out in a similar manner until the byte counter 13 reaches a value of zero and the DMA transfer end. At this time, the address counter 10 has a value of N/2+4, indicating the next DMA address which is N+8.

In the case (2) in FIG. 5 (example (2) in FIG. 4a), the DMA start address is N+1 representative of an odd value and hence the address counter 10 is set with a value of N/2 and the flip-flop 16 is set to "1". Since the byte counter has an even value of 6, the flip-flop 17 remains reset. During the first DMA transfer, an address of N is sent to the address bus 11 and because of setting of the flip-flop 16 and resetting of the flip-flop 17, the even address data inhibiting signal 33 now assuming logical value "1" is delivered out of the control circuit 14. On the other hand, the odd address data inhibiting signal 35 assumes logical value "0" and delivery thereof is prevented. Consequently, only the odd address data undergoes DMA transfer. At this time, the address counter 10 is incremented by one to reach N/2+1, thereby setting the next DMA address to N+2. Count down of the byte counter 13 is not carried out as will be detailed later with reference to FIG. 6 and the value of the byte counter remains 3. Thereafter, during the second and third DMA transfer, delivery of both the address data inhibiting signals 33 and 35 is prevented to carry out 2-byte DMA transfer together with an incrementing of the address counter 10 and decrementing of the byte counter 13. During the fourth DMA transfer in which the byte counter 13 assumes a value of 1, an address of N+6 is sent to the address bus 11 and because of setting of the flip-flop 16 and resetting of the flip-flop 17, the odd address data inhibiting signal 35 assumes logical value "1" and is delivered out of the control circuit 14. Consequently, only the even address data undergoes DMA transfer. At this time, the address counter 10 is incremented by one to reach N/2+4 and the byte counter 13 is decremented by one to reach zero, thus ending the entire DMA transfer control.

In the case (3) in FIG. 5 (example (3) in FIG. 4a), the DMA start address is N and the transfer byte number is 7 so that the flip-flop 16 is reset and the flip-flop 17 is set. As a result, during the first DMA transfer, an address of N is sent to the address bus 11 and both the inhibiting signals assume "0" with their delivery prevented, thereby carrying out DMA transfer of 2 byte data. Further, the address counter 10 is incremented by one and the byte counter 13 is decremented by one. Similarly, during the second and third DMA transfer, the DMA transfer is carried out in unit of 2-byte data. But, during the fourth DMA transfer in which the byte counter 13 assumes "1", because of the condition that the flip-flop 16 is reset and the flip-flop 17 is set, the odd address inhibiting signal is delivered out of the control circuit 14 and DMA transfer of one-byte data in the form of even address data alone is carried out. Concurrently therewith, the address counter 13 is incremented by one, reaching N/2+4 and the byte counter 13 is decremented by one to reach zero, thereby completing the DMA control.

In the case (4) in FIG. 5 (example (4) in FIG. 4a), the DMA start address is N+1 and the transfer byte number is 7 so that the flip-flop 16 is set and the flip-flop 17 is also set. As a result, during the first DMA transfer, an address of N is sent to the address bus 11, and the even address data inhibiting signal assumes "1" and is delivered out of the control circuit 14, thereby carrying out DMA transfer of one byte in the form of odd address data alone. Concurrently therewith, the address counter 10 is incremented by one whereas the byte counter 13 is not decremented. Thereafter, during the second, third and fourth DMA transfer, none of the inhibiting signals is delivered out of the control circuit 14 and hence DMA transfer is carried out in units of two-byte data together with simultaneous delivery of addresses of N+2, N+4 and N+6 to the address bus 11. Consequently, the address counter 10 reaches N/2+4 and the byte counter 13 reaches zero, thereby completing the entire DMA control.

As described above, when a transfer inhibiting signal 19 consisting of the even address data and odd address data inhibiting signals is sent to the memory, the transfer on the data bus 8 becomes a one byte transfer. The least significant bit of the address count number and that of the byte count number are used for preparation of the transfer inhibiting signal 19 when they are latched at the flip-flops 16 and 17, respectively. When the least significant bit of the address count number is "1" as in the cases (2) and (4) in FIG. 5, indicating that the DMA transfer starts from an odd address, this logical value is sent as an inhibiting signal 19 against an even address data byte during the initial DMA cycle. Conversely, when either the least significant bit of the byte count number is "0" as in the case (2) in FIG. 5 to indicate an odd transfer start address or the least significant bit of the byte count number is "1" as in the case (3) in FIG. 5 to indicate an even transfer start address, an inhibiting signal 19 against an odd address data byte is sent during the final DMA cycle.

Turning to FIG. 6, there is illustrated a logical circuit which may form the data control circuit shown in FIG. 2.

An address counter set signal 31 is applied to set the address counter 10 and at the same time the least significant bit 20 of the address count number is set into the flip-flop 16. A NOR circuit 25 is connected to receive at one input the address counter set signal 31 and at the other input a master reset signal 32 for the system, and it produces an output signal which sets a flip-flop 22. An AND circuit 24 having one input connected to receive an output signal Q of the flip-flop 22 and the other input connected to receive an output signal Q of the flip-flop 16 produces an output signal which serves as the even address data inhibiting signal 33. Upon completion of the initial DMA cycle, the DMA control circuit 15 (FIG. 2) is caused to send a DMA advance signal 41 for incrementing the address counter 10 and decrementing the byte counter 13. By this DMA advance signal, the address counter 10 is incremented by one and the flip-flop 22 is reset. This flip-flop 22 is inhibited from being set until the next set signal 31 for the address counter 10 or the master reset signal 32 is generated. Accordingly, the even address data inhibiting signal 33 which is issued only when the output signal Q of this flip-flop 22 is ANDed is permitted to be sent only during the first DMA cycle.

Subsequently, an AND circuit 27 produces an output signal serving as the odd address data inhibiting signal 35. To this end, the AND circuit 27 is connected to receive at one input an output signal of an exclusive OR circuit 26 having one input connected to receive the output signal Q of the flip-flop 16 and the other input connected to receive an output signal Q of the flip-flop 17 and to receive at the other input a borrow signal 34 of the byte counter 13 for indication of the final DMA cycle.

Where there occurs a one byte transfer during the initial or final DMA cycle as in the cases (2), (3) and (4) in FIGS. 4a and 4b, it is necessary to inhibit the decrementing of the byte counter 13 only at the termination of the first DMA cycle. To this end, a byte count down inhibiting signal 36 is used which represents the output signal of a NOR circuit 29 having one input connected to receive the output signal Q of the flip-flop 16 and the other input connected to receive the output signal Q of the flip-flop 17. A flip-flop 23 is reset by an output signal of a NOR circuit 40 having one input connected to receive a byte counter set signal 37 and the other input connected to receive the master reset signal 32 for the system; and after completion of the first DMA cycle, it is set by the DMA advance signal 41 for counting down the byte counter 13. Once set, this flip-flop 23 is inhibited from being reset until the next byte counter set signal 37 or the master reset signal 32 is generated.

An OR circuit 28, connected to receive at one input an output signal Q of this flip-flop 23 and at the other input the byte count down inhibiting signal 36, produces an output signal which serves as a byte count down inhibiting signal 38 after completion of the first DMA cycle. An AND circuit 30 having one input connected to receive the byte count down inhibiting signal 38 and the other input connected to receive the DMA advance signal 41 produces an output signal serving as a byte count down signal 39. With this connection, the byte count down signal 39 is inhibited only when at least one of the least significant bit of the address count and that of the byte count is "1" and the first DMA cycle runs.

If the address counter 10 and the byte counter 13 are conditionally set by the use of a program, common use of the flip-flop 22 and 23 as well as NOR circuits 25 and 40 will be possible.

As has been described, according to the invention, the two-byte processing can be assured throughout the entire DMA cycle, though the amount of hardware of the adaptor is slightly increased, on condition that the initial and final DMA cycles are specially processed, thereby improving through-put of the bus over the entire system. An adaptor of an 8-bit data bus system added to the data control circuit according to the present invention may easily be coupled to a 16-bit data bus.

We claim:

1. In a data processing system having a processor and a memory connected to said processor via a system bus for storing bytes of data identified by even or odd addresses and being capable of reading or writing two bytes of data having an even and a succeeding odd address in one operation in response to receipt of the even address, an input/output adaptor connected to said system bus and at least one input/output unit for effecting DMA data transfer in a controlled manner at one byte per cycle or two bytes per cycle of the processor between said input/output unit and said memory comprising:

an address counter and a byte counter connected to said system bus to receive from the processor and store an address for the memory and a byte number indicating the number of bytes of data to be transferred in a DMA operation, respectively, such that the bits of the address and the byte number are stored into stages of the address counter and byte counter by shifting the bits one bit to the right so that the least significant bit of the address and the byte number are not stored in the respective counters;

buffer means connected to said address counter and said system bus for receiving the contents of said address counter and for supplying said contents along with an added bit in the least significant position to said system bus as an address which is always an even address; and DMA control means for incrementing said address counter for each processor cycle a number of times according to said byte number, whereby DMA data transfer at two bytes per cycle is effected on the basis of the even addresses applied to said system bus from said buffer means.

2. A data processing system according to claim 1, further including a first storage device connected to receive and store the least significant bit of said address provided by said processor via said system bus, a second storage device connected to receive and store the least significant bit of said byte number provided by said processor via said system bus, and data control means connected to said first and second storage devices for applying a first inhibit signal to said memory during the first cycle of DMA data transfer to inhibit said memory from reading or writing a data byte having an even address when the content of said first storage means indicates that the address received from said processor is an odd address and for applying a second inhibit signal to said memory during the last cycle of DMA data transfer to inhibit said memory from reading or writing a data byte having an odd address when the content of said first and second storage means do not coincide.

3. A data processing system according to claim 2, wherein said data control means includes decrementing means for decrementing said byte counter each cycle of said processor as said address counter is incremented, and means for inhibiting said decrementing means during the first cycle of DMA data transfer when the contents of said address counter and byte counter indicate that an odd address or an odd byte number or both an odd address and an odd byte number are received from said processor via said system bus.

4. A data processing system according to claim 1, further including a first storage device connected to receive and store the least significant bit of said address provided by said processor via said system bus, a second storage device connected to receive and store the least significant bit of said byte number provided by said processor via said system bus, and data control means connected to said first and second storage devices and said memory for inhibiting the data transfer of data bytes having an even address during the first cycle of DMA data transfer when the content of said first storage device is an odd number and for inhibiting the data transfer of data bytes having an odd address during the last cycle of DMA data transfer when the content of said second storage device is different from the content of said first storage device.

5. A data prcessing system according to claim 4, wherein said data control means includes decrementing means for decrementing said byte counter each cycle of said processor as said address counter is incremented, and means for inhibiting said decrementing means during the first cycle of DMA data transfer when the contents of said address counter and byte counter indicate that an odd address or an odd byte number or both an odd address and an odd byte number are received from said processor via said system bus.

* * * * *